(12) United States Patent
Safar

(10) Patent No.: US 9,658,647 B1
(45) Date of Patent: May 23, 2017

(54) EXPANDABLE SCREEN DISPLAY DEVICE

(71) Applicant: Samir Hanna Safar, San Diego, CA (US)

(72) Inventor: Samir Hanna Safar, San Diego, CA (US)

(73) Assignee: Samir Hanna Safar, San Diego, CA (US)

( * ) Notice: Subject to any disclaimer, the term of this patent is extended or adjusted under 35 U.S.C. 154(b) by 0 days.

(21) Appl. No.: 15/209,932

(22) Filed: Jul. 14, 2016

(51) Int. Cl.
*G06F 1/16* (2006.01)
*G09G 5/00* (2006.01)
*H04B 1/3888* (2015.01)

(52) U.S. Cl.
CPC ............ *G06F 1/163* (2013.01); *G06F 1/1637* (2013.01); *G06F 1/1641* (2013.01); *H04B 1/3888* (2013.01)

(58) Field of Classification Search
CPC ...... G06F 1/163; G06F 1/1601; G06F 1/1637; G06F 1/1641; G06F 1/1647; G06F 1/1692
USPC .................. 361/679.03, 679.04; 345/1.1, 1.3
See application file for complete search history.

(56) References Cited

U.S. PATENT DOCUMENTS

| | | | | |
|---|---|---|---|---|
| 8,964,365 | B2* | 2/2015 | Kim ..................... | H04M 1/0237 361/679.04 |
| 9,580,948 | B2* | 2/2017 | Nakamura .......... | H04M 1/0247 |
| 2002/0080095 | A1* | 6/2002 | O'nan ................... | G06F 1/1601 345/10 |
| 2005/0270730 | A1* | 12/2005 | Klushin ................ | G06F 1/1601 361/679.27 |
| 2007/0247798 | A1* | 10/2007 | Scott ..................... | G06F 1/1616 361/679.04 |
| 2009/0275366 | A1* | 11/2009 | Schilling ............... | G06F 1/1615 455/566 |
| 2010/0060587 | A1* | 3/2010 | Freund .................. | G06F 1/1616 345/169 |
| 2011/0176260 | A1* | 7/2011 | Walters ................. | G06F 1/1641 361/679.01 |

FOREIGN PATENT DOCUMENTS

KR    WO 2013062224 A1 *  5/2013  ........... G06F 1/1624

* cited by examiner

*Primary Examiner* — Nidhi Thaker

(57) ABSTRACT

The present invention relates to a novel expandable screen display device, which is an add-on device adapted to encase a wearable communication device such as a smart phone or a smart watch. The expandable screen display device comprises a first enclosure with a first control module, a second enclosure with a second control module, such that the first control module and the second control module are in wireless communication for selective expansion of the expandable screen display device according to user input received via a mobile software application residing on the wearable communication device.

8 Claims, 3 Drawing Sheets

EXPANDABLE SCREEN DISPLAY DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

FIELD OF THE INVENTION

The present invention belongs to the field of display units and more particularly relates to a novel expandable device for a wearable communication unit, such as a wrist watch or a smart mobile phone, or an integrated watch cum phone device.

BACKGROUND OF THE INVENTION

Wearable communication devices such as watches and mobile phones capable of being worn on the wrist are in use. Such devices provide the user the multiple functionality of a watch or a phone. There has been a lot of effort to integrate new functional features on the display unit of such wearable devices. Given the various computing capabilities associated with smart phone cum wearable devices, it is desirable to have a larger screen area for purposes such as e-commerce transactions, browsing and reading applications while a smaller and compact mode when the device is not in use. Below are given some of the known prior art.

Chinese patent reference no. CN205103554U claims an intelligent watch wherein the intelligent watch is located in a slidable structure transverse to the belt.

Chinese patent reference no. CN205103553U describes a combination type intelligent watch. In this utility model the intelligent watch and the watch are respectively set at watch dial and watch belt so as to make the user can be use at the same time the intelligent watch with the traditional functions of watch.

Korean patent reference KR101602365B1 describes a portable terminal wherein a wireless communication unit is radially positioned in the radial center of the plurality of selection, which is arranged to display a clock instructions indicating a current time on a display screen, and the interlocking part or the whole of said radially arranged selection and application items provides a mobile terminal including a control unit.

Chinese patent reference CN205038451U describes a utility model that describes an intelligent watch for solving the problem that because of the intelligent watch the display screen of a smaller size is inconvenient to the user. Said intelligent watch comprises a watch with a folding screen sensor and controller wherein the folding screen is installed on the watch belt and rotatably connected with the display screen.

This utility model claims an intelligent mobile phone list is used for timing display time information sending and receiving information and answer phone and so on.

Chinese patent reference CN205003459U describes a sliding double screen intelligent watch that aims at solving the problem of traditional intelligent watch screen which is small for user operation.

Despite various improvements and progress in the field, some of the major obstacles that still exist involve making changes to the basic structure and design of conventional watch. Many of these references, such as the ones in which the screen rotates or slides require lot of moving parts and expensive sensors and end up being bulky in size and uncomfortable for the user to wear. Here is the risk of loss or breakage of the several moving parts. These approaches are costly to implement and complicated to use for the user too. The references using modifications to the watch straps or belt also involve wireless connectivity and changes to existing belts and straps, thereby making the proposed inventions impractical to implement. The belt would not only end up being costlier but would also involved additional power source.

Accordingly, improvements are needed in the existing methods and structures that negate the above shortcomings in the existing systems.

However the purpose and methodology of all the above inventions that are part of prior art do not envisage the unique embodiment of an expandable screen display device used as an add-on component that can be expanded as per the requirement of the user, does not compromise on the aesthetics of the smart watch and does not involve any additional modifications to the existing design of the watch or the belt. The display device can be adjusted to different expansion configurations and does not require an additional power source.

The scope of the invention is to be determined by the terminology of the following description, claims, drawings and the legal equivalents thereof.

SUMMARY OF THE INVENTION

The present invention may be summarized, at least in part, with reference to its objects.

It is therefore a primary objective of the present invention to provide an expandable screen display device that is an add-on component to encase an existing wearable communication device, such as a watch, a smart watch, a mobile phone or a smart watch cum mobile phone that can be expanded as per the requirement of the user. The device does not compromise on the aesthetics of the wearable communication device and does not involve any additional modifications to the existing design of the wearable communication device or the belt. The display device can be adjusted to different expansion configurations and does not require an additional power source.

Another objective of the present invention is to provide a novel expandable screen display device that is an add-on component and easy to implement, integrate and manufacture for use with traditional wearable communication smart devices such as a smart watch cum mobile phone device.

Another objective of the present invention is to provide a novel expandable screen display device that does not require an additional power source.

A further objective of the present invention is to provide a novel expandable screen display device that does not involve many small moving parts and is not costly to produce.

The invention described herein thus comprises a novel expandable screen display device that is incorporated as a casing for an existing wearable communication device, as an add-on component. The expandable screen display device comprises of a first enclosure and a second enclosure, configured such that the first enclosure and the second enclosure are capable of sliding out such that they touch each other and together in combination with the screen of the wearable communication device combine to provide an integrated and larger screen display area. The expandable screen display device is controlled by a smartphone application installed on the wearable communication device, which supports at least network Wi-Fi, Wi-Fi Direct and/or Bluetooth and/or Near Field Communication (NFC). The smartphone application ("app") allows the wearable communication device to operate in an expanded screen mode or a non-expanded screen mode, by controlling the sliding in and out of the first enclosure and the second enclosure. When the user selects the expanded screen mode from the smartphone application, the first enclosure and the second enclosure slide out to form an expanded display screen along with the screen of the wearable communication device. When the user selects the non-expanded screen mode, the first enclosure and the second enclosure slide in to cover and enclose the screen of the wearable communication device.

In the expanded screen mode, the first enclosure and the second enclosure combine to generate a larger screen display. Since the screen of the wearable communication device is also available for display, all the images and information on the wearable communication device are visible in a larger or zoomed in and magnified view to the user.

The above summary is intended to illustrate exemplary embodiments of the invention, which will be best understood in conjunction with the detailed description to follow, and are not intended to limit the scope of the invention.

Additional objects and embodiments of the invention will be set forth in part in the description which follows, and in part will become apparent to those skilled in the art upon examination of the following, or may be learned by practice of the invention. Thus these and other objects of the present invention will be more readily apparent when considered in reference to the following description and when taken in conjunction with the accompanying drawings.

DETAILED DESCRIPTION OF THE INVENTION

Figure 1:
FIG. 1 is an illustrative diagram depicting the expandable screen display device in the non-expanded mode.

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

The following description is presented to enable any person skilled in the art to make and use the invention, and is provided in the context of particular applications of the invention and their requirements.

The invention described herein thus comprises a novel expandable screen display device that is incorporated as a casing for an existing wearable communication device, as an add-on component. The expandable screen display device comprises of a first enclosure and a second enclosure, configured such that the first enclosure and the second enclosure are capable of sliding in and out, over the wearable communication device. The expandable screen display device is controlled by a smartphone application installed on the wearable communication device, which supports at least network Wi-Fi, Wi-Fi Direct and/or Bluetooth and/or Near Field Communication (NFC).

The expandable screen display device comprises of a first enclosure and a second enclosure, configured such that the first enclosure and the second enclosure are capable of sliding out such that along with the screen of the wearable communication device, they provide an integrated and larger screen display area. The expandable screen display device is controlled by a smartphone application installed on the wearable communication device, which supports at least network Wi-Fi, Wi-Fi Direct and/or Bluetooth and/or Near Field Communication (NFC).

The smartphone application allows the wearable communication device to operate in an expanded screen mode or a non-expanded screen mode, by controlling the sliding in and out of the first enclosure and the second enclosure. When the user selects the expanded screen mode from the smartphone application, the first enclosure and the second enclosure slide out to form an expanded display screen along with the screen of the wearable communication device. When the user selects the non-expanded screen mode, the first enclosure and the second enclosure slide in to cover the screen of the wearable communication device.

In the expanded screen mode, the first enclosure and the second enclosure combine to generate a larger screen display. Since the screen of the wearable communication device is also available for display, all the images, screen menu and information displayed on the wearable communication device are visible in a larger or zoomed in view to the user.

Similarly, in the non-expanded screen mode, the first enclosure and the second enclosure slide in to touch each other across the edges so as to cover and enclose the entire screen of the wearable communication device.

With reference to FIG. 1, 10 depicts an expandable screen display device in accordance with an embodiment of the present invention. 10 comprises of a first enclosure 11 and a second enclosure 13. In FIG. 1, 10 is shown in the non-expanded mode.

Figure 2:
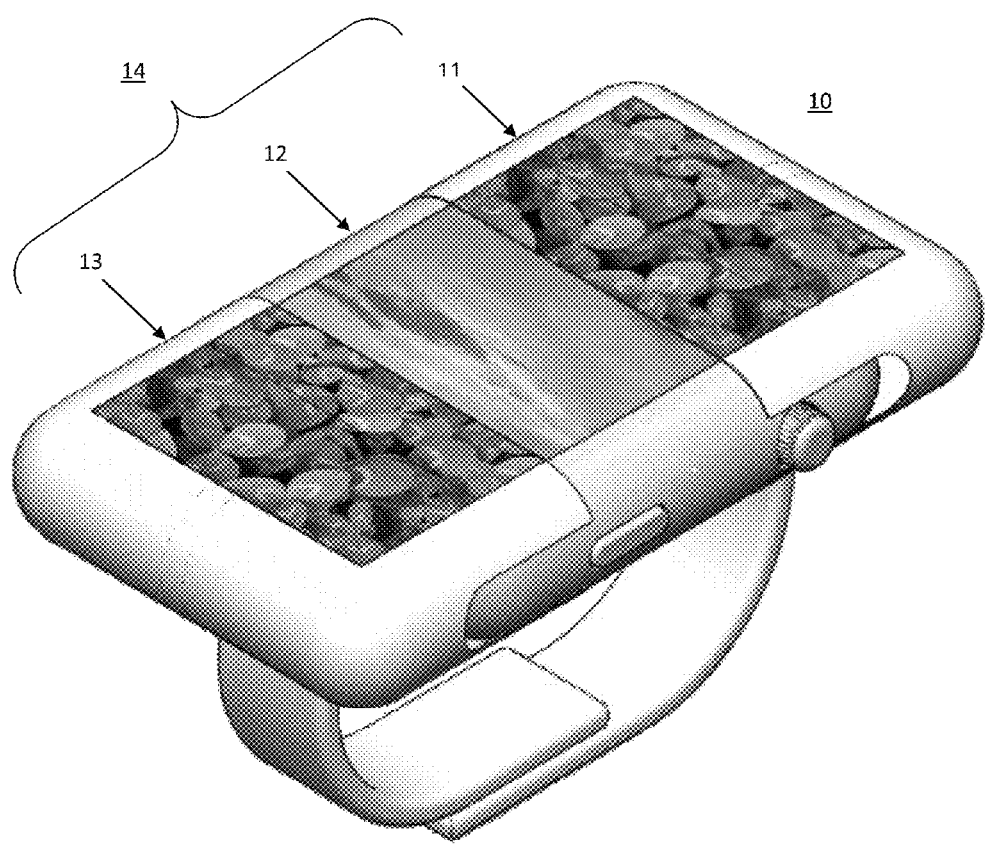
FIG. 2 is an illustrative diagram depicting the expandable screen display device in the expanded mode.

With reference to FIG. 2, 10 depicts an expandable screen display device in accordance with an embodiment of the present invention. 10 comprises of a first enclosure 11 and a second enclosure 13, 12 represents the wearable communication device. The display areas of the first enclosure 11, the second enclosure 13 and the wearable communication device 12, together constitute the integrated screen display area 14. In FIG. 2, 10 is shown in the expanded mode.

Figure 3:
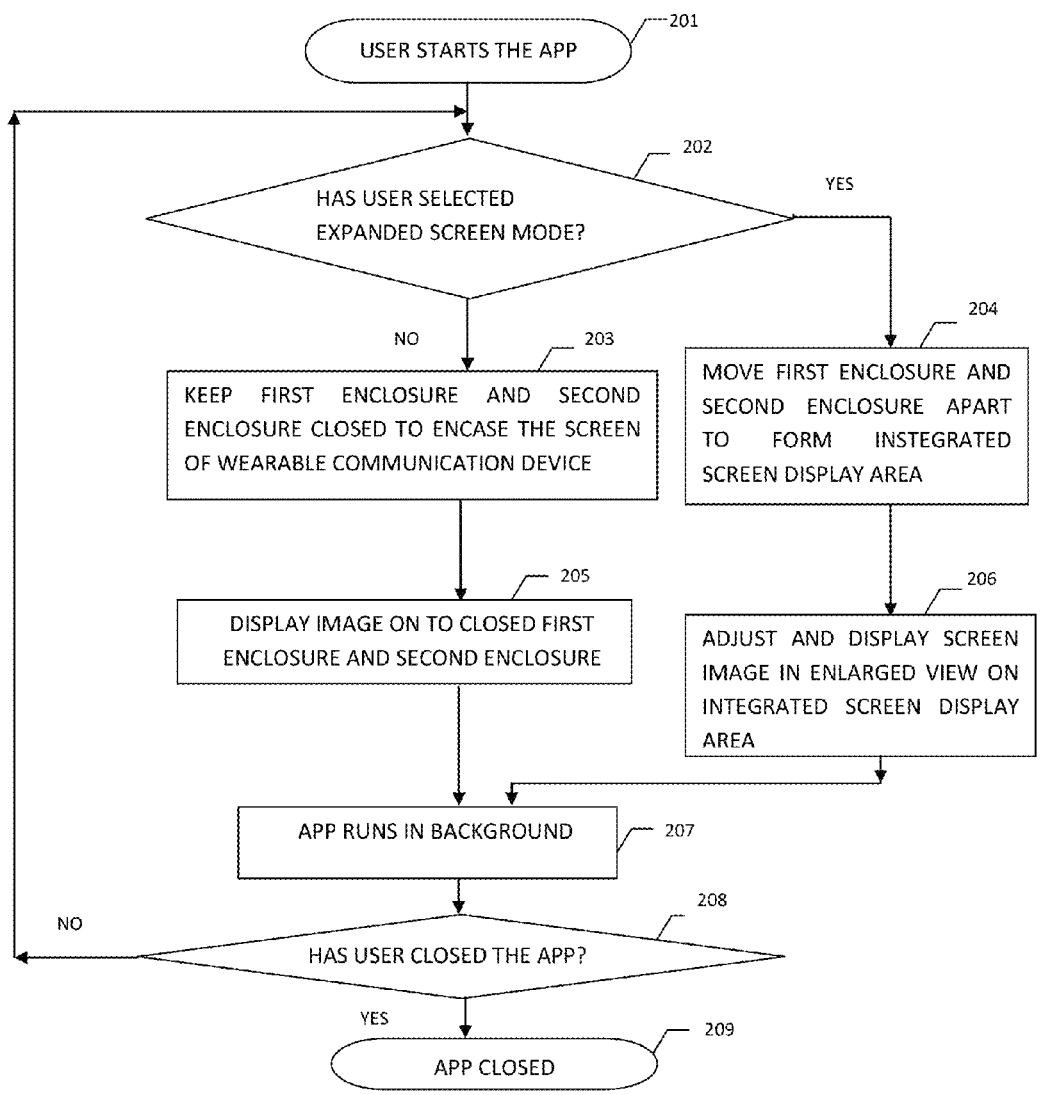
FIG. 3 is an illustrative flow chart depicting the sequence of important steps in an embodiment of the present invention.

FIG. 3 depicts an example methodology illustrating the steps followed in one embodiment of the invention. It is to be understood and appreciated that the present invention is not limited by order of steps and that some of the steps may occur in different order and/or concurrently with other steps from that illustrated here. At step 201, the user starts the application residing in the wearable communication device ("app"). At step 202, the app determines whether the user has selected the expanded screen mode or the non-expanded screen mode. Based on the user choice, if the expanded screen mode has not been selected at step 203, the first enclosure and the second enclosure are kept closed and encase the screen of the wearable communication device. At step 205, the screen menu image is displayed as such to the user. Based on the user choice, if the expanded screen mode has been selected at step 203, the first enclosure and the second enclosure slide apart at step 204 to form the integrated screen display area. At step 206, an enlarged or magnified view of the screen menu image is displayed on the integrated screen display area. At step 207, the app continues to run in the background. At step 208, it is determined if the user has closed the app. Based on the user choice, the app is closed at step 209.

Accordingly the present invention is an expandable screen display device encasing a wearable communication device, comprising
  a first enclosure with a first control module;
  a second enclosure with a second control module;
  the first control module and the second control module in wireless communication for selective expansion of the expandable screen display device according to user input received via a mobile software application residing on the wearable communication device,
  characterized in that the first enclosure and the second enclosure touch each other along the edges to encase the screen of the wearable communication device in the non-expanded mode, and,
  the first enclosure and the second enclosure slide apart and along with the screen of the wearable communication device form an integrated screen display area for magnified display, in the expanded mode.

The first enclosure 11 and the second enclosure 13 are made of a light weighted polymeric material such that the sliding in and sliding out of the enclosures does not require high energy consumption and can be powered by the existing battery source.

In an embodiment of the invention, these enclosures may be provided in transparent or coloured fashion.

In an embodiment of the invention, more than two enclosures may be provided.

In one embodiment of the invention, different and distinct images or screen menus may be displayed on the first enclosure, second enclosure and the screen display area of the wearable communication device, in the expanded screen mode.

In one embodiment of the invention, different portions of a given image or screen menus may be displayed on the first enclosure, second enclosure and the screen display area of the wearable communication device, in the expanded screen mode.

The present invention acts as an add-on component to an existing wearable communication without having to modify the body of existing watches on the market. The invention does not involve any small parts that will break or any new processing unit or power supply source.

The first enclosure and the second enclosure are configured to slide snugly on the outer edges of the wearable communication device in the non-expanded mode and are aesthetic and light weight, and match with the contours of the existing design.

The first enclosure and the second enclosure are also provided with a control module which is in smartphone based application ("app") installed on the wearable communication device.

The present invention provides selective expansion of the display screen by the user using a software application present on a users wearable communication device that is in wireless communication with the control modules provided on the first enclosure and the second enclosure of the expandable screen display device.

Short range communication technologies such as Near Field Communication and Bluetooth protocol as known in prior art are used to control the sliding in and sliding out of the first enclosure and the second enclosure in the expanded and non-expanded mode.

A user can select the expanded or non expanded mode depending on convenience. The user's touch events are interpreted as different commands and wirelessly communicated smartphone application to the control modules provided on the first enclosure and the second enclosure respectively.

The control module is configured to transmit and receive wireless signals. In the present embodiment, this module may be configured as a Bluetooth communication module transmitting and receiving Bluetooth signals or a Wi-Fi network module transmitting and receiving Wi-Fi signals.

In alternate embodiments, the user input can be provided in the form of touch, voice, audio or music or gestures.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

In this application, the terminology 'embodiment' can be used to describe any aspect, feature, process or step, any combination thereof, and/or any portion thereof, etc.

Although the present invention has been described illustrating Bluetooth protocol as wireless communication means, Zigbee, Near Field Communication and Radio Frequency Identification means may also be used to achieve the desired results.

In alternate embodiments, the expandable screen display device may be provided by more than two enclosures.

In an alternate embodiment, the first enclosure and the second enclosure may be provided such that they are capable of sliding apart along a vertical axis or a horizontal axis.

In an alternate embodiment, a plurality of enclosures may be provided in various geometric configurations, such that they are capable of moving apart in different directions.

In an alternate embodiment, the app has additional functionality for user authentication to ensure that only authorized users can control the expansion of the screen.

In an alternate embodiment, the expandable screen area is at least double than that of the screen display device in non-expanded mode.

In an alternate embodiment, different expansion modes are possible for selection by the user, such as 50% 75%, 100%, 200%, 300% more of the screen display area.

In an alternate embodiment, the expanded screen area is at least double than that of the screen display device in non-expanded mode.

In an alternate embodiment, the wearable communication device is not restricted to a smartphone or a smart watch, but can also include a cellular phone, a personal digital assistant (PDA), a GPS device, a smartbook, a netbook, a notebook, an ultra-mobile personal computer and a wearable computing device.

Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

I claim:

1. An expandable screen display device encasing a wearable communication device, comprising: a first enclosure with a first screen and a first control module; a second enclosure with a second screen and a second control module; the first control module and the second control module in wireless communication for selective expansion of the expandable screen display device according to user input received via a mobile software application residing on the wearable communication device, characterized in that the first enclosure and the second enclosure are coplanar and touch each other along the edges to encase a screen of the wearable communication device in a non-expanded mode, and, the first enclosure and the second enclosure slide apart and along with the screen of the wearable communication device form an integrated screen display area for magnified display, in an expanded mode.

2. The expandable screen display device as claimed in claim 1 comprising a third enclosure.

3. The expandable screen display device as claimed in claim 1 wherein a material of construction is a light weight polymeric substance.

4. The expandable screen display device as claimed in claim 1 wherein the integrated screen display area is at least double than that of a screen area in the non-expanded mode.

5. The expandable screen display device as claimed in claim 1 wherein different expansion modes are possible.

6. The expandable screen display device as claimed in claim 1, wherein the mobile software application residing on the wearable communication device is capable of associating user input in the form of touch, audio or gestures.

7. The expandable screen display device as claimed in claim 1, wherein the wearable communication device is selected from a group consisting of a smart phone, a mobile phone, a cellular phone, a personal digital assistant (PDA), a GPS device, a smartbook, a netbook, a notebook, an ultra-mobile personal computer and a wearable computing device.

8. The expandable screen display device as claimed in claim 1, wherein the wireless communication means between the wearable communication device and the first and second control modules present on the first and second enclosures is selected from a group consisting of Bluetooth, Zigbee, Near Field Communication and Radio Frequency identification means.

* * * * *